(12) United States Patent
Tominaga

(10) Patent No.: US 11,327,319 B2
(45) Date of Patent: May 10, 2022

(54) HEAD MOUNTED DISPLAY, IMAGE DISPLAY METHOD, AND COMPUTER PROGRAM

(71) Applicant: Sony Interactive Entertainment Inc., Tokyo (JP)

(72) Inventor: Takehiro Tominaga, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/052,280

(22) PCT Filed: May 15, 2018

(86) PCT No.: PCT/JP2018/018709
§ 371 (c)(1),
(2) Date: Nov. 2, 2020

(87) PCT Pub. No.: WO2019/220527
PCT Pub. Date: Nov. 21, 2019

(65) Prior Publication Data
US 2021/0157144 A1     May 27, 2021

(51) Int. Cl.
*G02B 27/01* (2006.01)

(52) U.S. Cl.
CPC .... *G02B 27/0172* (2013.01); *G02B 2027/014* (2013.01); *G02B 2027/0138* (2013.01); *G02B 2027/0187* (2013.01)

(58) Field of Classification Search
CPC ...... G02B 2027/0138; G02B 2027/014; G02B 2027/0187; G02B 27/0172; H04N 13/327; H04N 13/344; G09G 3/20
See application file for complete search history.

(56) References Cited

U.S. PATENT DOCUMENTS

| 5,485,172 A | 1/1996 | Muraoka |
| 8,212,830 B2 | 7/2012 | Ogiso |

(Continued)

FOREIGN PATENT DOCUMENTS

| JP | 3292091 A | 12/1991 |
| JP | 6343184 A | 12/1994 |
| JP | 2008197394 A | 8/2008 |

OTHER PUBLICATIONS

International Search Report for corresponding PCT Application No. PCT/JP2018/018709, 2 pages, dated Aug. 7, 2018.

(Continued)

*Primary Examiner* — Dmitriy Bolotin
(74) *Attorney, Agent, or Firm* — Matthew B. Dernier, Esq.

(57) ABSTRACT

A left panel has a portion exceeding a size of a left lens, and a left-eye image displayed in an area of the left panel, which exceeds the size of the left lens, is not visually recognized by a user. A right panel has a portion exceeding a size of a right lens, and a right-eye image displayed in an area of the right panel, which exceeds the size of the right lens, is not visually recognized by the user. An HMD stores a display start position of the left-eye image and a display start position of the right-eye image. The HMD acquires a left-eye image having a size corresponding to the size of the left lens and a right-eye image having a size corresponding to the size of the right lens, which are generated by an external apparatus. The HMD causes the left-eye image to be displayed from the display start position of left-eye image stored in advance and causes the right-eye image to be displayed from the display start position of right-eye image stored in advance.

10 Claims, 5 Drawing Sheets

(56) References Cited

U.S. PATENT DOCUMENTS

| | | | |
|---|---|---|---|
| 2002/0113755 A1* | 8/2002 | Lee | G02B 7/12 |
| | | | 345/7 |
| 2003/0063209 A1* | 4/2003 | Enomoto | G02B 7/06 |
| | | | 348/335 |
| 2005/0128287 A1* | 6/2005 | Hanzawa | H04N 13/344 |
| | | | 348/42 |
| 2008/0192060 A1 | 8/2008 | Ogiso | |
| 2008/0297437 A1* | 12/2008 | Takahashi | G02B 27/017 |
| | | | 345/8 |
| 2019/0333480 A1* | 10/2019 | Lang | G02B 27/017 |
| 2020/0252602 A1* | 8/2020 | Oonishi | G02B 27/0179 |
| 2021/0157144 A1* | 5/2021 | Tominaga | H04N 13/327 |

OTHER PUBLICATIONS

International Preliminary Report on Patentability and Written Opinion for for corresponding PCT Application No. PCT/JP2018/018709, 13 pages, dated Nov. 26, 2020.

\* cited by examiner

ENTERTAINMENT SYSTEM 100

HEAD MOUNTED DISPLAY, IMAGE DISPLAY METHOD, AND COMPUTER PROGRAM

TECHNICAL FIELD

The present invention relates to a data processing technology, and particularly to a head mounted display, an image display method, and a computer program.

BACKGROUND ART

In recent years, technological development for presenting stereoscopic images has progressed, and head mounted displays (hereinafter also referred to as "HMDs") capable of presenting stereoscopic images with depth have become widespread. In such an HMD, when an image for a left eye and an image for a right eye having parallax are input, the image for the left eye is displayed on a left panel, and then the image for the left eye is magnified by a left lens and presented to a user, and further, the image for the right eye is displayed on a right panel, and then the image for the right eye is magnified by a right lens and presented to the user. As a result, the stereoscopic effect of the image presented by the HMD can be enhanced, and a deep immersive feeling can be given to the user.

In the manufacturing process of the HMD, the positions of the left panel and the right panel may be misaligned and also, the positions of the left lens and the right lens may be misaligned due to assembly errors. If the left and right panels or the left and right lenses are misaligned, the user may not obtain the correct stereoscopic effect and the user may get tired. It takes a lot of cost to reduce the assembly error in the manufacturing process of the HMD. Therefore, after manufacturing the HMD, the misalignment of the panels or the lenses is measured, and the image for the left eye and the image for the right eye whose drawing positions are shifted from each other may be created according to the misalignment.

CITATION LIST

[Patent Literature] [PTL 1] JP 2008-197394 A

SUMMARY

Technical Problems

In the case of shifting the drawing positions of the image for the left eye and the image for the right eye, a complicated process of transmitting a different assembly error value for each HMD to upper layer software (application) that executes the drawing process is required. Further, the application needs to be provided with a process for shifting the drawing positions of the image for the left eye and the image for the right eye so as to absorb the assembly error, which may increase the development cost of the application.

The present invention has been made in view of the above problems, and one object thereof is to provide a technology for efficiently absorbing an assembly error of an HMD or reducing a data transfer amount.

Solution to Problems

In order to solve the above problems, a head mounted display according to an aspect of the present invention includes a left screen that displays a left-eye image, a right screen that displays a right-eye image, a left lens that magnifies the left-eye image displayed on the left screen and presents the magnified left-eye image to a user, a right lens that magnifies the right-eye image displayed on the right screen and presents the magnified right-eye image to the user, a storage unit, an acquisition unit, and a control unit. The left screen has a portion exceeding a size of the left lens, and the left-eye image displayed in an area of the left screen, the area exceeding the size of the left lens, is not visually recognized by the user. The right screen has a portion exceeding a size of the right lens, and the right-eye image displayed in an area of the right screen, the area exceeding the size of the right lens, is not visually recognized by the user. The storage unit stores a display start position of the left-eye image on the left screen and a display start position of the right-eye image on the right screen. The display start position of the left-eye image and the display start position of the right-eye image are set to different values depending on at least one of misalignment between the left screen and the right screen and misalignment between the left lens and the right lens. The acquisition unit acquires the left-eye image having a size corresponding to the size of the left lens and the right-eye image having a size corresponding to the size of the right lens, which are images generated by an external apparatus. The control unit causes the left-eye image acquired by the acquisition unit to be displayed from the display start position of the left-eye image on the left screen stored in the storage unit and causes the right-eye image acquired by the acquisition unit to be displayed from the display start position of the right-eye image on the right screen stored in the storage unit.

Another aspect of the present invention is also a head mounted display. This head mounted display includes a left screen that displays a left-eye image, a right screen that displays a right-eye image, a left lens that magnifies the left-eye image displayed on the left screen and presents the magnified left-eye image to a user, a right lens that magnifies the right-eye image displayed on the right screen and presents the magnified right-eye image to the user, a storage unit, a generation unit, and a control unit. The left screen has a portion exceeding a size of the left lens, and the left-eye image displayed in an area of the left screen, the area exceeding the size of the left lens, is not visually recognized by the user. The right screen has a portion exceeding a size of the right lens, and the right-eye image displayed in an area of the right screen, the area exceeding the size of the right lens, is not visually recognized by the user. The storage unit stores a display start position of the left-eye image on the left screen and a display start position of the right-eye image on the right screen. The display start position of the left-eye image and the display start position of the right-eye image are set to different values depending on at least one of misalignment between the left screen and the right screen and misalignment between the left lens and the right lens. The generation unit generates the left-eye image having a size corresponding to the size of the left lens and the right-eye image having a size corresponding to the size of the right lens. The control unit causes the left-eye image generated by the generation unit to be displayed from the display start position of the left-eye image on the left screen stored in the storage unit and causes the right-eye image generated by the generation unit to be displayed from the display start position of the right-eye image on the right screen stored in the storage unit.

Yet another aspect of the present invention is a method for displaying an image. This method is executed by a head mounted display including a left screen for displaying a left-eye image, a right screen for displaying a right-eye image, a left lens for magnifying the left-eye image displayed on the left screen and presenting the magnified left-eye image to a user, a right lens for magnifying the right-eye image displayed on the right screen and presenting the magnified right-eye image to the user, and a storage unit. The left screen has a portion exceeding a size of the left lens, and the left-eye image displayed in an area of the left screen, the area exceeding the size of the left lens, is not visually recognized by the user. The right screen has a portion exceeding a size of the right lens, and the right-eye image displayed in an area of the right screen, the area exceeding the size of the right lens, is not visually recognized by the user. The storage unit stores a display start position of the left-eye image on the left screen and a display start position of the right-eye image on the right screen. The display start position of the left-eye image and the display start position of the right-eye image are set to different values depending on at least one of misalignment between the left screen and the right screen and misalignment between the left lens and the right lens. The method includes a step of acquiring the left-eye image having a size corresponding to the size of the left lens and the right-eye image having a size corresponding to the size of the right lens, which are images generated by an external apparatus, and a step of causing the left-eye image acquired in the acquiring step to be displayed from the display start position of the left-eye image on the left screen stored in the storage unit and causing the right-eye image acquired in the acquiring step to be displayed from the display start position of the right-eye image on the right screen stored in the storage unit.

It should be noted that any combination of the above constituent elements and the expression of the present invention converted among a system, a program, a recording medium storing the program, and the like are also effective as an aspect of the present invention.

[Advantageous Effects of Invention] [0011] According to the present invention, an assembly error of an HMD can be efficiently absorbed, or a data transfer amount can be reduced.

DESCRIPTION OF EMBODIMENTS

First Embodiment

Figure 1:
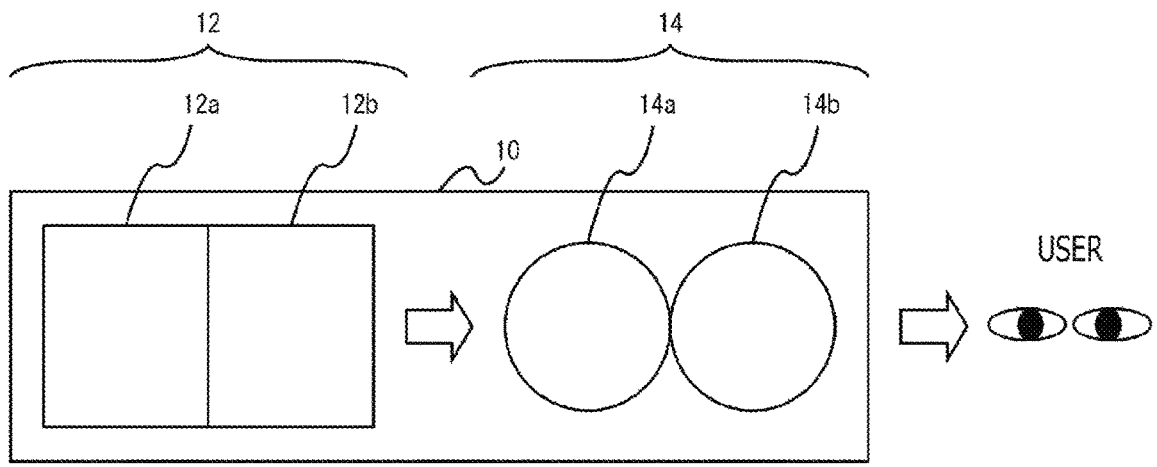
FIG. 1 is a diagram schematically illustrating a configuration of an HMD.

FIG. 1 schematically illustrates a configuration of an HMD 10. The HMD 10 includes a left panel 12*a* and a right panel 12*b* collectively referred to as a panel 12, and a left lens 14*a* and a right lens 14*b* collectively referred to as a lens 14. The panel 12 includes a screen configured by a liquid crystal display (LCD) or an organic light-emitting diode (OLED), for example. The left panel 12*a* includes a screen that displays an image to be presented to the user's left eye (hereinafter, "left-eye image"), and the right panel 12*b* includes a screen that displays an image to be presented to the user's right eye (hereinafter, "right-eye image").

The left lens 14*a* and the right lens 14*b* are convex lenses, for example. The left lens 14*a* magnifies the left-eye image displayed on the left panel 12*a* and presents the magnified image to the user's left eye. The right lens 14*b* magnifies the right-eye image displayed on the right panel 12*b* and presents the magnified image to the user's right eye. This provides the user with a large viewing angle. In addition, a parallax is provided between the left-eye image and the right-eye image, which provides a stereoscopic effect to the user who views the left-eye image and the right-eye image at the same time. In this way, the HMD 10 presents a stereoscopic image to the user.

Figure 2:
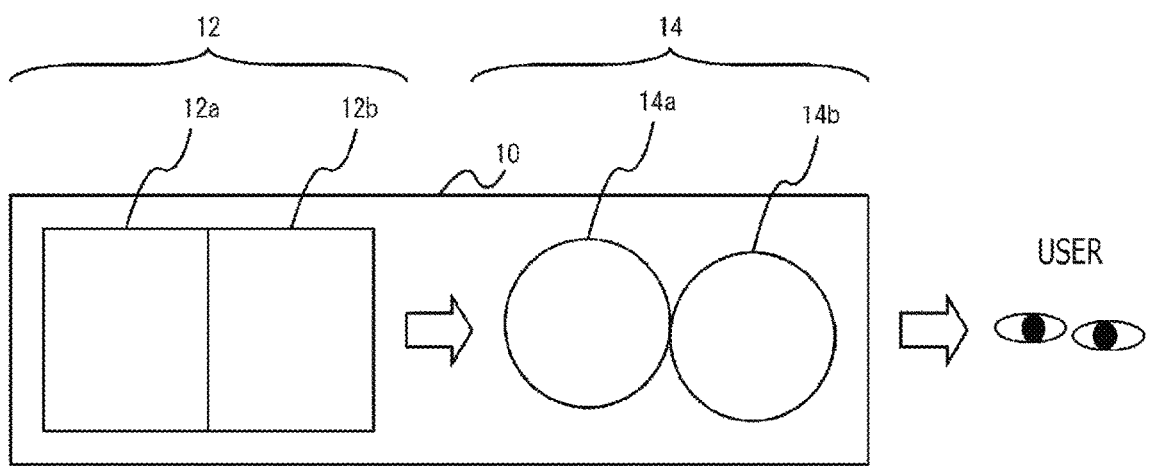
FIG. 2 is a diagram illustrating an example of an assembly error of the HMD.

In the HMD 10, an assembly error may occur in the manufacturing process, and misalignment may occur between the positions of the left lens 14*a* and the right lens 14*b*. Further, in a case where the left panel 12*a* and the right panel 12*b* are made by combining different panels, misalignment may occur between the positions of the left lens 14*a* and the right lens 14*b*. FIG. 2 illustrates an example of the assembly error of the HMD 10. In the figure, the positions of the left lens 14*a* and the right lens 14*b* are vertically misaligned. A deviation in a left-right direction is canceled out by adjustment of a distance between pupils (pupil distance (PD)) that is different for each user (wearer of the HMD 10) and is thus unlikely to cause a problem. On the other hand, if the vertical misalignment occurs, the user cannot be given a correct stereoscopic effect, and the user gets tired.

Further, in order to reduce the manufacturing cost of the HMD 10, there is a restriction such that mass-produced general-purpose panels (in other words, panels having general resolutions) are used. A general-purpose panel is a full high definition (HD) (1920 horizontal×1080 vertical pixels=16:9) OLED panel, for example. In the embodiment, a size of each of the left panel 12*a* and the right panel 12*b* is 960 horizontal×1080 vertical pixels (horizontal 8:vertical 9).

Moreover, in order to reduce the manufacturing cost of the HMD 10, there is a restriction such that general-purpose lenses that are mass-produced are used. The general-purpose lens is usually circular. Further, in the HMD 10 of the embodiment, the size of the left panel 12*a* is larger than a size of the left lens 14*a*, and similarly, the size of the right panel 12*b* is larger than a size of the right lens 14*b*. In the embodiment, a diameter of the left lens 14*a* is a length corresponding to a length (960 pixels) in a lateral direction of the left panel 12*a* (the same in the embodiment). A diameter of the right lens 14*b* is also the same (960 pixels).

Light that is output from the panel 12 and does not pass through the lens 14 does not reach the eyes of the user. Therefore, the image displayed in an area of the left panel 12*a* that exceeds the size of the left lens 14*a* is invisible to the user and is not visually recognized by the user. Similarly, the image displayed in an area of the right panel 12*b* that exceeds the size of the right lens 14*b* is not visually recognized by the user. The area of the panel 12 that exceeds the size of the lens 14 can be said to be an area of the panel 12 that is not covered by the lens 14, can be said to be an area of the panel 12 that is outside a range of the user's field of view through the lens, and further can be said to be an area of the panel 12 where the output light does not reach the user's eyes.

In contrast, light output from the panel 12 and passing through the lens 14 reaches the eyes of the user. Therefore, the image displayed in the area of the left panel 12a that does not exceed the size of the left lens 14a is visually recognized by the user. Similarly, the image displayed in the area of the right panel 12b that does not exceed the size of the right lens 14b is visually recognized by the user. The area of the panel 12 that does not exceed the size of the lens 14 can be said to be an area of the panel 12 covered by the lens 14, can be said to be an area of the panel 12 that is within the range of the user's field of view through the lens, and further can be said to be an area of the panel 12 where the output light reach the user's eyes.

Figure 3:
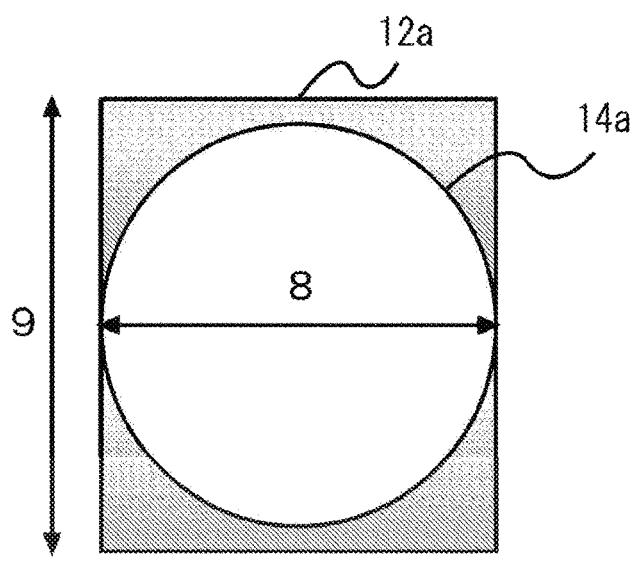
FIG. 3 is a diagram illustrating a panel size and a lens size.

FIG. 3 is a diagram illustrating the size of the panel 12 and the size of the lens 14. The left panel 12a has the size of 960 horizontal pixels×1080 vertical pixels whereas the left lens 14a has a length corresponding to 960 pixels in diameter. Hence, the image displayed in the range of the left panel 12a that is not covered by the left lens 14a (shaded portion in FIG. 3, which can be said to be a range exceeding the size of the left lens 14a) is not visually recognized by the user. Therefore, a total of 120 pixels (approximately 11%) of an upper part and a lower part of the left panel 12a is a region where the displayed image cannot be seen by the user, namely, a useless region.

In order to reduce the assembly error in the manufacturing process of the HMD 10, it is conceivable to adjust manufacturing equipment for the HMD 10 in a factory in a rigorous manner, but this takes a lot of time and cost. Thus, after the HMD 10 is manufactured, an assembly error of the HMD 10 (misalignment between the left lens 14a and the right lens 14b, or the like) is measured. Then, a process of shifting drawing positions of various objects (also referred to as "drawing targets") in the left-eye image and drawing positions of various objects in the right-eye image by a measurement value of the assembly error (also referred to as "assembly error absorption process") may be executed.

Figure 4:
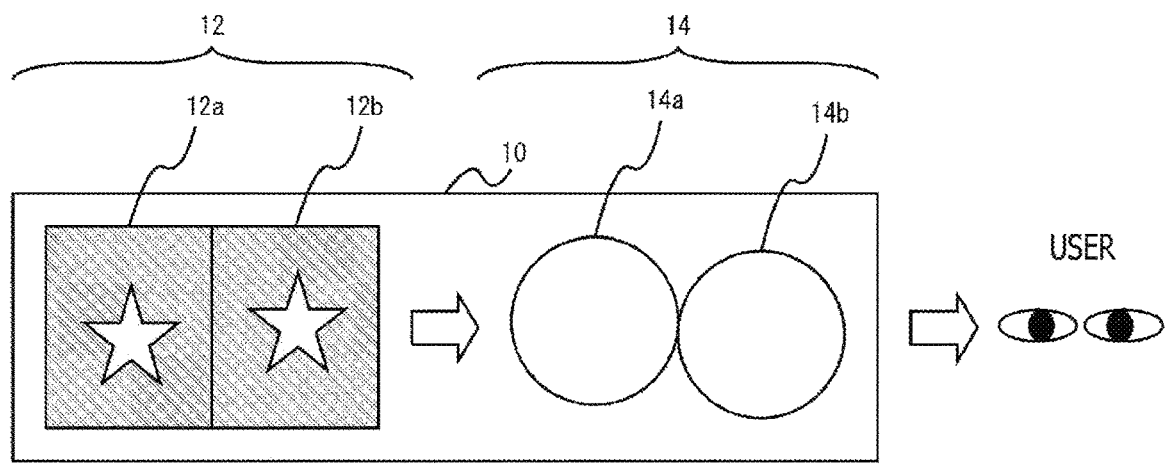
FIG. 4 is a diagram schematically illustrating an example of an assembly error absorption process.

FIG. 4 schematically illustrates an example of the assembly error absorption process. In the HMD 10 illustrated in the figure, the position of the left lens 14a is displaced to be higher than the position of the right lens 14b due to an assembly error. In this case, an image generating apparatus (such as a personal computer (PC) 30 to be described later) makes an adjustment such that the drawing position of the drawing target in the right-eye image displayed on the right panel 12b is higher than the drawing position of the drawing target in the left-eye image displayed on the left panel 12a. As a result, the heights of the left-eye image and the right-eye image look the same in the user's eyes, and a correct stereoscopic effect can be provided to the user. This method effectively utilizes the non-visible area of the panel 12 illustrated in FIG. 3.

However, the above-mentioned assembly error absorption process has the following problems.

(1) Complicated process and increase of load:
A complicated process of transmitting an assembly error value that differs for each HMD to upper layer software (application) that executes the drawing process is required. Further, the application needs to be provided with a process for shifting the drawing positions of the left-eye image and the right-eye image so as to absorb the assembly error, which may increase the development cost of the application.

(2) The size of transferred image data increases:
Current computers require a relatively large amount of power to store and transfer data, which is a disadvantage in terms of power consumption. For example, the power required for communication between the image generating apparatus (such as the PC 30 to be described later) and the HMD 10 increases. This is a significant problem in the case of operating the HMD 10 with a battery.

Figure 5:
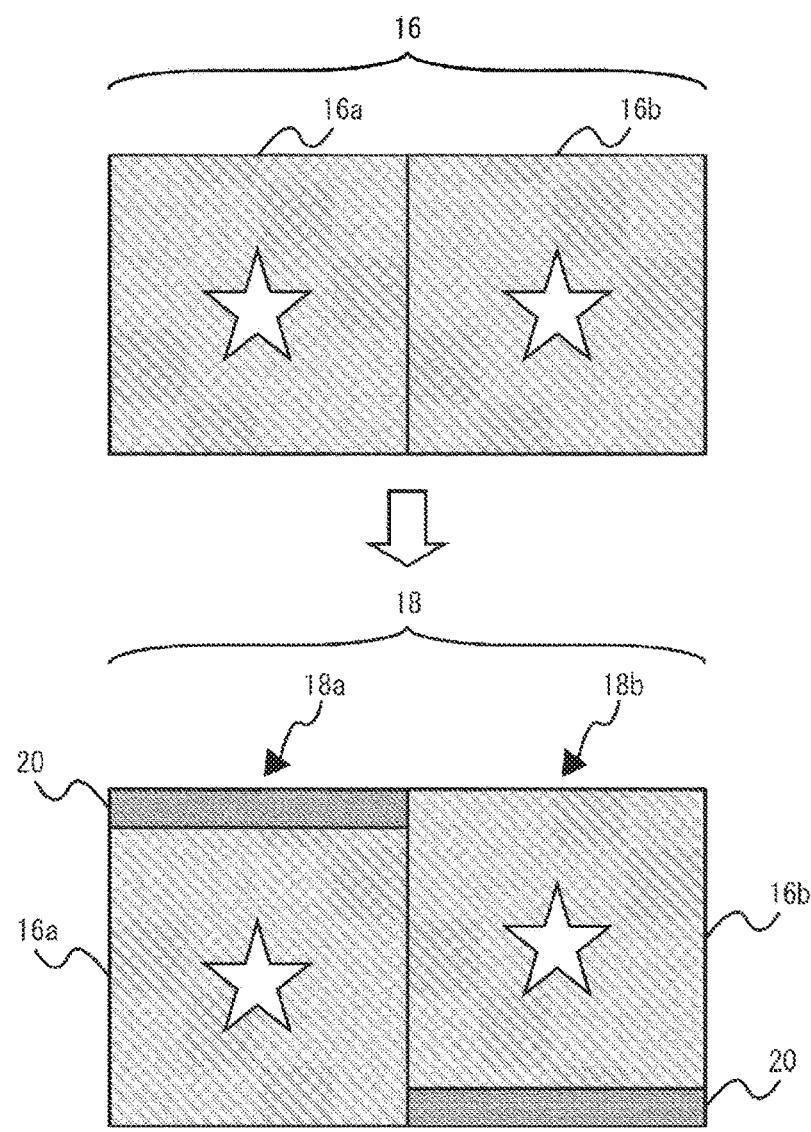
FIG. 5 is a diagram schematically illustrating the assembly error absorption process in an embodiment.

In order to solve such a problem, in the embodiment, a mechanism for absorbing an assembly error is introduced into a display system semiconductor or a display device in the HMD 10. FIG. 5 schematically illustrates the assembly error absorption process in the embodiment. The image generating apparatus (such as the PC 30 to be described later) of the embodiment generates an image of a size corresponding to the size of the lens 14 regardless of the presence or absence of an assembly error in the HMD 10, in other words, without considering the assembly error. This image is an image illustrating a state of a virtual space to be presented to the user and is also referred to as an "original image" below.

An original image 16 in the embodiment includes a left-eye original image 16a and a right-eye original image 16b. The left-eye original image 16a has the same size as the left lens 14a (horizontal 960 pixels×vertical 960 pixels) and is smaller than the left panel 12a. Similarly, the right-eye original image 16b has the same size as the right lens 14b (horizontal 960 pixels×vertical 960 pixels) and is smaller than the right panel 12b. The left-eye original image 16a and the right-eye original image 16b are provided with a parallax but do not include misalignment caused by an assembly error. That is, the left-eye original image 16a and the right-eye original image 16b are images in which the objects of the drawing targets are arranged at normal positions determined by an image generating application.

In the first embodiment, a signal conversion mechanism (an image output unit 50 to be described later) of the HMD 10 causes the left panel 12a to display a left-eye display image 18a in which a fixed image 20 is added to a lacking portion of the left-eye original image 16a with respect to the left panel 12a. Similarly, the HMD 10 causes the right panel 12b to display a right-eye display image 18b in which the fixed image 20 is added to a lacking portion of the right-eye original image 16b with respect to the right panel 12b. The fixed image 20 is independent of contents of the left-eye original image 16a and is also independent of contents of the right-eye original image 16b. The fixed image 20 of the embodiment is an image with a fixed pixel value such as only black. The left-eye display image 18a and the right-eye display image 18b are collectively referred to as a "display image 18."

Further, in the first embodiment, a display start position of the left-eye original image 16a on the left panel 12a and a display start position of the right-eye original image 16b on the right panel 12b can be set independently, which leads to absorption of the assembly error of the HMD 10. With such a configuration, the process of absorbing the assembly error of the HMD 10 can be achieved only by the HMD 10. The image generating apparatus only needs to generate the original image 16 within the range visually recognized by the user and can reduce the complexity of the process related to image generation. In addition, the amount of communication between the image generating apparatus and the HMD 10 can be reduced.

Figure 6:
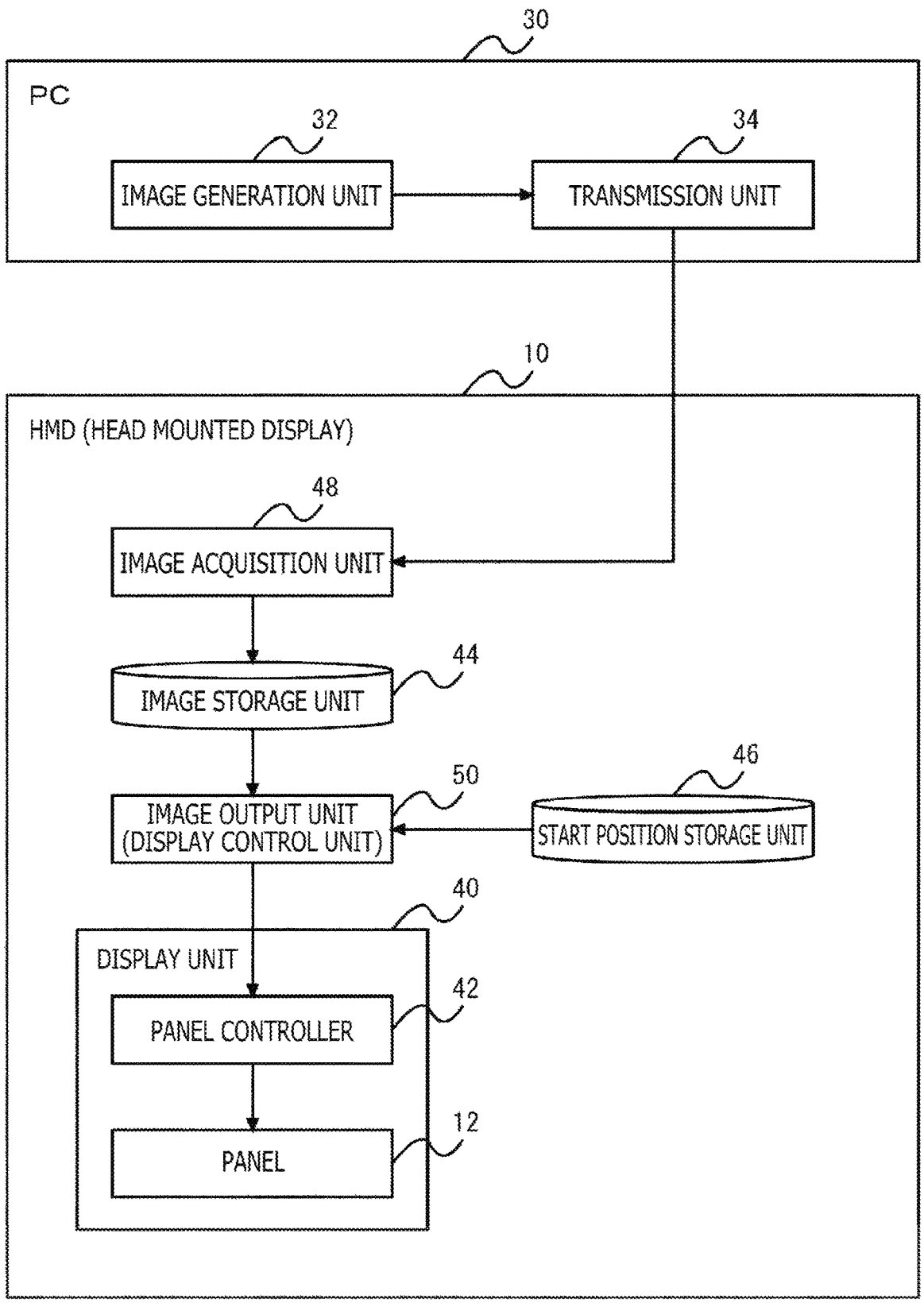
FIG. 6 is a diagram illustrating a configuration of an entertainment system according to a first embodiment.

FIG. 6 illustrates a configuration of an entertainment system 100 of the first embodiment. The entertainment system 100 is an information processing system including the PC 30 that is an information processing apparatus that generates an image and the HMD 10 that is an information processing apparatus that displays an image. The PC 30 and the HMD 10 may be connected by high-definition multimedia interface (HDMI) (registered trademark). Note that the entertainment system 100 may include a game apparatus, a smartphone, a tablet terminal, or the like instead of the PC 40.

FIG. 6 includes a block diagram illustrating functional blocks of the PC 30. The PC 30 includes an image generation unit 32 and a transmission unit 34. Each block illustrated in the block diagram of the present specification can be achieved by an element such as a central processing unit (CPU) and a memory of a computer, an electronic circuit, or a mechanical apparatus in terms of hardware, and a computer program or the like in terms of software, and here, functional blocks achieved by cooperation of these are illustrated. Therefore, it is understood by those skilled in the art that these functional blocks can be implemented in various ways by combining hardware and software.

A storage of the PC 30 may store a computer program (an image generating application for a virtual reality (VR) game, for example) including a plurality of modules corresponding to the image generation unit 32 and the transmission unit 34. The CPU or a graphics processing unit (GPU) of the PC 30 may fulfill the functions of the image generation unit 32 and the transmission unit 34 by reading the computer program into a main memory and executing the program.

The image generation unit 32 generates the original image 16 representing a state of the virtual space to be presented to the user according to a progress status of the game and the like. To be specific, the image generation unit 32 generates the left-eye original image 16a to be displayed on the left panel 12a of the HMD 10 and the right-eye original image 16b to be displayed on the right panel 12b of the HMD 10.

As described with reference to FIG. 5, the image generation unit 32 generates the left-eye original image 16a having a size corresponding to the size of the left lens 14a and the right-eye original image 16b having a size corresponding to the size of the right lens 14b. In the embodiment, the size of the left lens 14a and the size of the left-eye original image 16a are the same, and the size of the left lens 14a and the size of the left-eye original image 16a are also the same. Further, the image generation unit 32 provides a parallax between the left-eye original image 16a and the right-eye original image 16b, but draws the drawing target at a normal position regardless of the presence or absence of the assembly error in the HMD 10. For example, as illustrated in FIG. 4, even in the case of the left lens 14a and the right lens 14b being vertically misaligned, the left-eye original image 16a and the right-eye original image 16b with no vertical misalignment as illustrated in FIG. 5 are generated.

The transmitting unit 34 transmits the left-eye original image 16a and the right-eye original image 16b generated by the image generation unit 32 to the HMD 10.

FIG. 6 includes a block diagram illustrating functional blocks of the HMD 10. The HMD 10 includes a display unit 40, an image storage unit 44, a start position storage unit 46, an image acquisition unit 48, and an image output unit 50. A storage of the HMD 10 may store a computer program (for example, image display software) including a plurality of modules corresponding to these plurality of functional blocks. A CPU or a GPU of the HMD 10 may fulfill the functions of the above plurality of functional blocks by reading the computer program into a main memory and executing the program. Incidentally, although not illustrated in FIG. 6, the HMD 10 also includes the lens 14 as illustrated in FIG. 1.

The display unit 40 includes the panel 12 and a panel controller 42. The panel 12 of the embodiment is a single OLED panel having 1920 horizontal pixels and 1080 vertical pixels. A range of 960 horizontal pixels×1080 vertical pixels on the left side of the panel 12 viewed from the user functions as the left panel 12a, and a range of 960 horizontal pixels×1080 vertical pixels on the right side viewed from the user functions as the right panel 12b. As a modification example, the panel 12 may be a combination of the left panel 12a and the right panel 12b that are independent of each other.

The panel controller 42 drives display elements in the panel 12 according to a signal output from the image output unit 50 so as to cause the panel 12 to display the display image 18. The panel controller 42 causes the left panel 12a to display the left-eye display image 18a and causes the right panel 12b to display the right-eye display image 18b.

The image storage unit 44 is a storage area for temporarily storing data of the original image 16 transmitted from the PC 30. The image storage unit 44 further stores predetermined data of the fixed image 20 (for example, pixel values of the fixed image 20). The start position storage unit 46 is a non-volatile memory that permanently stores the display start position of the left-eye original image 16a on the left panel 12a and the display start position of the right-eye original image 16b on the right panel 12b.

The display start position may be represented by a coordinate value in a vertical direction at which the display of the original image should start, or may be represented by data that specifies a distance (the number of lines) from the top of the panel. The display start position of the left-eye original image 16a is determined such that the left-eye original image 16a falls within the range covered by the left lens 14a. The display start position of the right-eye original image 16b is determined such that the right-eye original image 16b falls within the range covered by the right lens 14b. Further, the display start position of the left-eye original image 16a and the display start position of the right-eye original image 16b have values that reflect the assembly error of the HMD 10. The details will be described below.

After the HMD 10 is manufactured, the assembly error (for example, the size of the vertical misalignment) of the left lens 14a and the right lens 14b is measured, and the display start position of the left-eye original image 16a and the display start position of the right-eye original image 16b are determined in advance on the basis of the measured value. To be specific, the display start position of the left-eye original image 16a and the display start position of the right-eye original image 16b are determined by using the measured value of the assembly error as a parameter in accordance with a predetermined rule for eliminating the assembly error. This rule may be set on the basis of knowledge of a developer, an experiment using the entertainment system 100, and the like.

Different values may be set for the display start position of the left-eye original image 16a and the display start position of the right-eye original image 16b, depending on the assembly error. As described in part with reference to FIGS. 4 and 5, in the case where the position of the left lens 14a is displaced to be higher than the position of the right lens 14b, the display start position of the right-eye original image 16b may be set to be higher than the display start position of the left-eye original image 16a. For example, the display start position of the left-eye original image 16a may be set to the 120th line from the top, and the display start position of the right-eye original image 16b may be set to the 0th line from the top (that is, displayed from the top).

In addition, in the case where the left panel 12a and the right panel 12b are independent panels, an assembly error (for example, a magnitude of vertical misalignment) between the left panel 12a and the right panel 12b may also be measured. Then, according to at least one of the measured value of the assembly error of the left lens 14a and the right lens 14b and the measured value of the assembly error of the left panel 12a and the right panel 12b, the display start position of the left-eye original image 16a on the left panel 12a and the display start position of the right-eye original image 16b on the right panel 12b may be determined.

The image acquisition unit 48 receives the data of the left-eye original image 16a and the right-eye original image 16b transmitted from the PC 30. The image acquisition unit 48 causes the image storage unit 44 to store the received data of the left-eye original image 16a and the right-eye original image 16b.

The image output unit 50 and the display unit 40 (panel controller 42) may be connected by mobile industry processor interface (MIPI). The image output unit 50 outputs a signal (for example, an MIPI signal) indicating contents of the display image 18 to the panel controller 42 to cause the panel 12 to display the display image 18 via the panel controller 42. Hereinafter, this processing will be simply referred to as causing the panel 12 to display an image. In the first embodiment, the image output unit 50 functions as a control unit that controls the display of the display image 18 on the panel 12.

To be specific, the image output unit 50 causes the left panel 12a to display the left-eye original image 16a stored in the image storage unit 44 from the display start position of the left-eye original image 16a stored in the start position storage unit 46. Further, the image output unit 50 causes the right panel 12b to display the right-eye original image 16b stored in the image storage unit 44 from the display start position of the right-eye original image 16b stored in the start position storage unit 46.

Further, the image output unit 50 makes the fixed image 20 displayed in the area of the left panel 12a where the left-eye original image 16a is not displayed. Further, the image output unit 50 makes the fixed image 20 displayed in the area of the right panel 12b where the right-eye original image 16b is not displayed. As a result, the left-eye display image 18a and the right-eye display image 18b as illustrated in FIG. 5 are made displayed.

In the first embodiment, the transmission unit 34 of the PC 30 sequentially transmits the data of the original image 16 to the HMD 10 line by line (scanning line). The image storage unit 44 stores the data of the original image 16 line by line. First, a process of causing the left panel 12a to display the left-eye display image 18a will be described. In a case where an output timing of the left-eye display image 18a comes, the image output unit 50 performs scan-out of data of the fixed image 20 stored in the image storage unit 44 line by line (that is, performs output to the panel controller 42) and causes the left panel 12a to display the fixed image 20 until the display start position of the left-eye original image 16a stored in the start position storage unit 46 is reached.

When the display start position of the left-eye original image 16a stored in the start position storage unit 46 has been reached, the image output unit 50 performs the scan-out of data of the left-eye original image 16a stored in the image storage unit 44 line by line and causes the left panel 12a to display the left-eye original image 16a. In a case where the scan-out of data of the left-eye original image 16a stored in the image storage unit 44 is completed and the area with no displayed image remains on the left panel 12a, the image output unit 50 performs the scan-out of data of the fixed image 20 line by line and makes the fixed image 20 displayed up to the bottom of the left panel 12a.

The process of causing the right panel 12b to display the right-eye display image 18b is also similar to the process of causing the left panel 12a to display the left-eye display image 18a. The image output unit 50 may execute the process of causing the left panel 12a to display the left-eye display image 18a and the process of causing the right panel 12b to display the right-eye display image 18b in parallel.

The PC 30 of the first embodiment may be a general-purpose PC, and the display unit 40 of the HMD 10 may be a general-purpose display device. The entertainment system 100 of the first embodiment can present the user with an image in which the assembly error is absorbed so as not to make the user's eye tired, even in the case of use of a general-purpose PC in which the process of absorbing the assembly error of the HMD 10 is not installed (in other words, a general-purpose image generation application). Further, since the data amount of the image generated by the PC 30 is reduced, the communication amount between the PC 30 and the HMD 10 can be reduced, and further, a size of the image storage unit 44 of the HMD 10 can also be reduced. As a result, the power consumption of the entertainment system 100 can also be reduced. It should be noted that the reduction of the image data amount is an effect achieved regardless of the presence or absence of the assembly error of the HMD 10.

Second Embodiment

Figure 7:
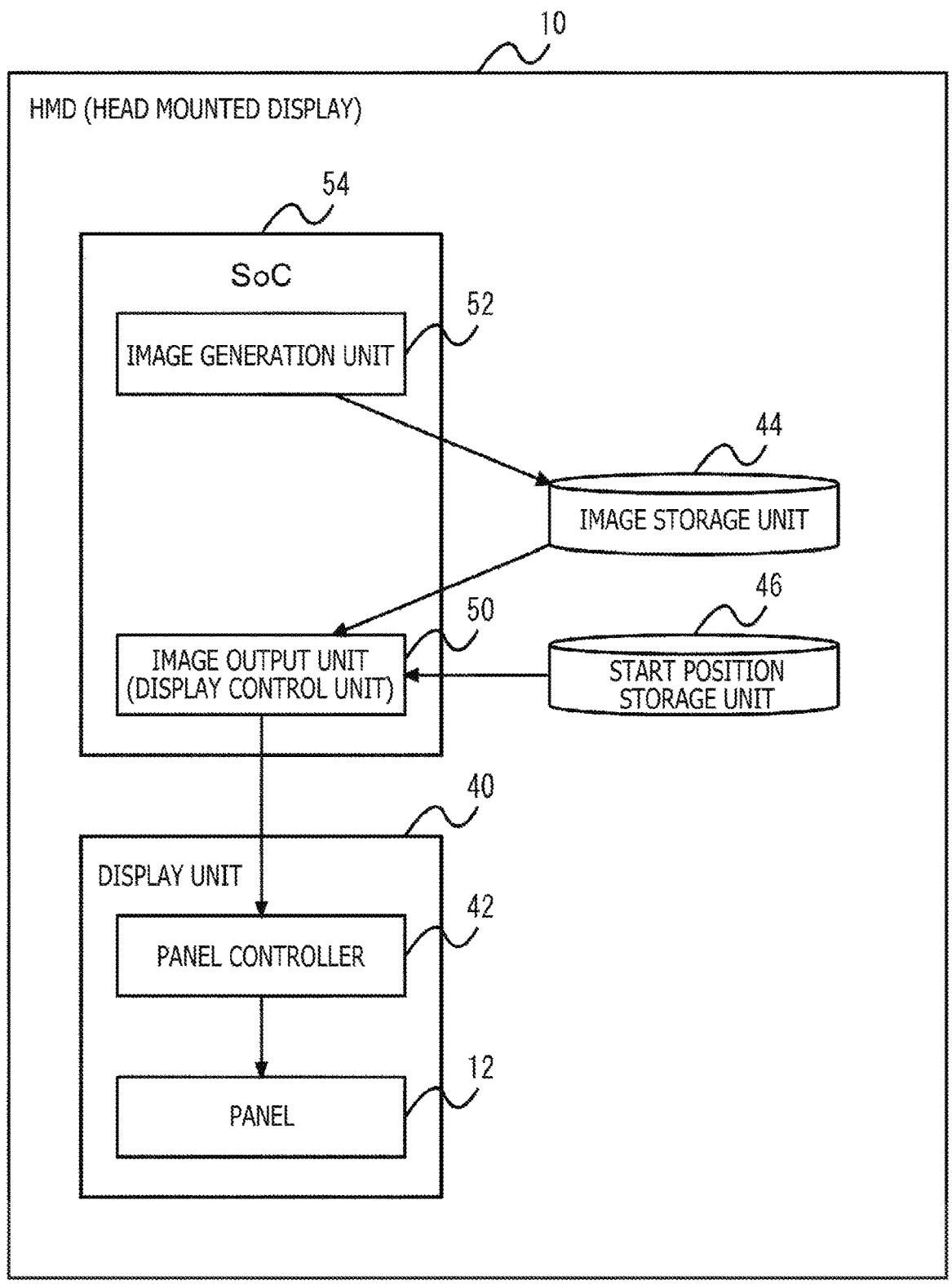
FIG. 7 is a diagram illustrating a configuration of an entertainment system according to a second embodiment.

FIG. 7 illustrates a configuration of the entertainment system 100 of the second embodiment. The entertainment system 100 of the second embodiment differs from that of the first embodiment in that the HMD 10 generates the original image 16. Components of the entertainment system 100 of the second embodiment, which are the same as or correspond to those of the entertainment system 100 of the first embodiment, are assigned the same reference signs as in the first embodiment. Further, repetition of the description made in the first embodiment will be omitted as appropriate.

The HMD 10 of the second embodiment includes an image generation unit 52 instead of the image acquisition unit 48 of the first embodiment (FIG. 6), but the other functional blocks are similar to those of the first embodiment. The image generation unit 52 corresponds to the image generation unit 32 of the PC 30 in the first embodiment and generates the original image 16 representing the state of the virtual space according to the progress of the game or the like. To be specific, the image generation unit 52 generates the left-eye original image 16a having a size corresponding to the size of the left lens 14a and the right-eye original image 16b having a size corresponding to the size of the right lens 14b. Further, the image generation unit 32 provides a parallax between the left-eye original image 16a and the right-eye original image 16b, but draws the drawing target in each image at a normal position without considering the assembly error in the HMD 10.

The image generation unit 52 stores the generated left-eye original image 16a and right-eye original image 16b in the image storage unit 44. Thereafter, similarly to the first embodiment, the image output unit 50 causes the left panel 12a to display the left-eye original image 16a stored in the image storage unit 44 from the display start position of the left-eye original image 16a stored in the start position storage unit 46. Further, the image output unit 50 causes the right panel 12b to display the right-eye original image 16b stored in the image storage unit 44 from the display start position of the right-eye original image 16*b* stored in the start position storage unit 46.

In the second embodiment, the image generation unit 52 may be achieved by a general-purpose GPU, and the display unit 40 may be achieved by a general-purpose display device. Further, the image generation unit 52 and the image output unit 50 are mounted on a system on a chip (SoC) 54. For example, the SoC 54 may exert the functions of the image generation unit 52 and the image output unit 50 by executing an image generation application for a VR game or the like.

The entertainment system 100 of the second embodiment also has effects similar to those of the first embodiment. That is, even in the case of use of an image generating application in which the process of absorbing the assembly error of the HMD 10 is not installed, the user can be provided with an image in which the assembly error is absorbed so as to make eyes less tired. Further, since the data amount of the image generated by the image generation unit 52 is reduced, the size of the image storage unit 44 can be reduced.

Third Embodiment

The HMD 10 of the third embodiment includes a display device (display unit 40) having a register capable of designating a display start position of an image. Further, the HMD 10 of the third embodiment has a mechanism for setting the display start position previously recorded in the non-volatile memory in the above register. Components of the entertainment system 100 of the third embodiment, which are the same as or correspond to those of the entertainment system 100 of the first embodiment, are assigned the same reference signs as in the first embodiment. Repetition of the description of the contents given in the first embodiment will be appropriately omitted.

Figure 8:
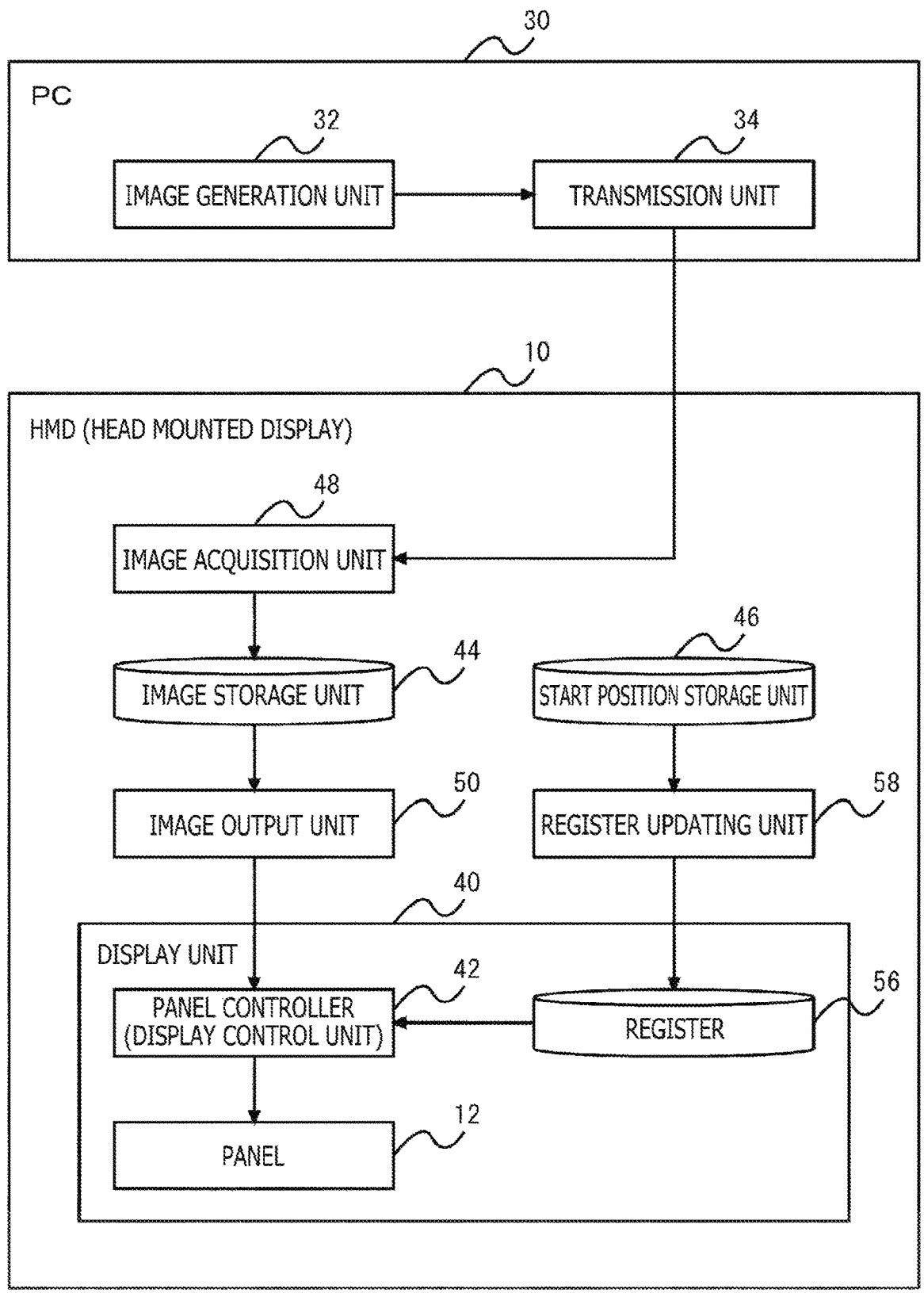
FIG. 8 is a diagram illustrating a configuration of an entertainment system according to a third embodiment.

FIG. 8 illustrates a configuration of the entertainment system 100 of the third embodiment. A configuration of the PC 30 of the third embodiment is similar to that of the first embodiment. The HMD 10 of the third embodiment further includes a register updating unit 58, and the display unit 40 of the HMD 10 further includes a register 56. The register 56 stores the display start position of the left-eye original image 16*a* on the left panel 12*a* and the display start position of the right-eye original image 16*b* on the right panel 12*b*.

The register updating unit 58 reads the display start position of the left-eye original image 16*a* and the display start position of the right-eye original image 16*b* stored in the start position storage unit 46 at a predetermined timing and stores the start positions in the register 56. The predetermined timing may be when the HMD 10 is started up or when the HMD 10 starts displaying an image, for example.

The image output unit 50 of the third embodiment performs the scan-out of data of the left-eye original image 16*a* stored in the image storage unit 44 line by line regardless of the assembly error in the HMD 10. In other words, the image output unit 50 sequentially outputs only the data of the left-eye original image 16*a* stored in the image storage unit 44 to the panel controller 42 line by line without scan-out of the fixed image 20. Similarly, the image output unit 50 performs the scan-out of data of the right-eye original image 16*b* stored in the image storage unit 44 line by line regardless of the assembly error in the HMD 10.

In the third embodiment, the panel controller 42 functions as a control unit that controls the display of the display image 18 on the panel 12. That is, the panel controller 42 causes the left panel 12*a* to display the left-eye original image 16*a* output from the image output unit 50 from the display start position of the left-eye original image 16*a* stored in the register 56. Further, the image output unit 50 causes the right panel 12*b* to display the right-eye original image 16*b* output from the image output unit 50 from the display start position of the right-eye original image 16*b* stored in the register 56.

To be specific, the panel controller 42 drives display elements in an area in which the left-eye original image 16*a* is to be displayed among the display elements (for example, OLED) forming the left panel 12*a* so as to cause the left panel 12*a* to display the left-eye original image 16*a*. For example, the panel controller 42 starts to drive the display elements according to output signals (data of the left-eye original image 16*a*) from the image output unit 50, from the display start position (specific line) of the left-eye original image 16*a* on the left panel 12*a* stored in the register 56.

On the other hand, the panel controller 42 suppresses the driving of display elements outside the area where the left-eye original image 16*a* is to be displayed among the display elements forming the left panel 12*a*, in other words, skips the drive control of the display elements. For example, the panel controller 42 does not drive the display elements in an area from the top of the left panel 12*a* to the display start position (specific line) of the left-eye original image 16*a* stored in the register 56. Further, even if a line which has not been controlled remains in the left panel 12*a*, the panel controller 42 suppresses the drive of the display elements configuring the uncontrolled line in the case of completion of output of one left-eye original image 16*a* from the image output unit 50.

Similarly, the panel controller 42 drives display elements in an area in which the right-eye original image 16*b* is to be displayed among the display elements (for example, OLED) that form the right panel 12*b* so as to cause the right panel 12*b* to display the right-eye original image 16*b*. On the other hand, the panel controller 42 suppresses the driving of display elements outside the area where the right-eye original image 16*b* is to be displayed among the display elements forming the right panel 12*b*.

As a result, a default color is displayed outside the area where the left-eye original image 16*a* is to be displayed on the left panel 12*a*. In addition, the default color is displayed also outside the area where the right-eye original image 16*b* is to be displayed on the right panel 12*b*. The default color differs depending on the type of the panel 12, but is black for OLEDs. Therefore, also in the third embodiment, the panel 12 can be made to display the display image 18 (for example, FIG. 5) that is substantially the same as in the first embodiment.

The PC 30 of the third embodiment may be a general-purpose PC, and the image output unit 50 of the HMD 10 may also be a general-purpose signal conversion mechanism. The entertainment system 100 of the third embodiment also has similar effects to the entertainment system 100 of the first embodiment. Further, unlike the first and second embodiments, in the third embodiment, since the fixed image 20 is not subjected to the scan-out, it is not necessary to store the original image 16 during the scan-out of the fixed image 20, and the capacity of the image storage unit 44 can be reduced.

The present invention has been described above on the basis of the first to third embodiments. It should be understood by those skilled in the art that each embodiment is an exemplification, various modifications can be made for combinations of the constituent elements and the processing processes, and such modifications are also within the scope of the present invention.

A first modification will be described. As a modification of the third embodiment, the HMD 10 may generate the original image 16 as in the second embodiment. In this case, the HMD 10 may include the image generation unit 52 instead of the image acquisition unit 48 in the configuration of the third embodiment (FIG. 8). In this modification, the image generation unit 52 of the HMD 10 may be implemented by a general-purpose GPU, and the image output unit 50 of the HMD 10 may be implemented by a general-purpose signal conversion mechanism. The configuration of this modification also has effects similar to those of the entertainment system 100 of the third embodiment.

A second modification will be described. The technologies described in the above-described embodiments and modifications are particularly suitable for correcting the deviation on the level of number of pixels. Thus, also possible is a combination in which, while the deviation on the level of number of pixels caused by the assembly error is corrected by using the technology described in any one of the embodiments or the modifications, the deviation on the subpixel level (in other words, the deviation of less than one pixel) is corrected by another system (correction by a known method).

A third modification will be described. The technologies described in the above embodiments and modifications can also be applied to display position adjustment caused by factors other than assembly error. For example, the technologies can be applied in a case where the display position of the original image 16 is finely adjusted according to the amount of movement of the HMD 10 after the image generation unit 32 or the image generation unit 52 has generated the original image 16. Further, the adjustment for absorbing the assembly error and the adjustment according to the amount of movement of the HMD 10 can also be combined.

A fourth modification will be described. In the description of the first embodiment, a rectangular image is illustrated as the original image 16 (FIG. 5), but the original image 16 may have the same shape as the lens 14, namely, a circular shape.

Incidentally, in the above embodiment, although it is assumed that the size of the left panel 12*a* is larger than that of the lens 14*a* and the size of the right panel 12*b* is larger than that of the right lens 14*b*, the lens 14 (circular, for example) does not need to be fully included inside the panel 12 (rectangular, for example). For example, the lens 14 may be larger in one of the vertical size and the horizontal size, and the panel 12 may be larger in the other size. The technologies described in the above embodiments and modifications are widely applicable in a case where the left panel 12*a* has a portion exceeding the size of the left lens 14*a* and the right panel 12*b* has a portion exceeding the size of the right lens 14*b*. In other words, the technologies described in the above-described embodiments and modifications are widely applicable in a case where a partial region of the left panel 12*a* (or the right panel 12*b*) is outside the visual field of the user through the left lens 14*a* (or the right lens 14*b*). Also in this configuration, effects similar to those of the above-described embodiments and modifications are obtained. For example, the HMD 10 may be a combination of the left panel 12*a* (or the right panel 12*b*) of the size of vertical 9×horizontal 8 and the left lens 14*a* (or the right lens 14*b*) having a diameter of 8.5. That is, even in a case where the left lens 14*a* (or the right lens 14*b*) has a larger horizontal size and the left panel 12*a* (or the right panel 12*b*) has a larger vertical size, the technologies described in the above embodiments and modifications are suitable.

Any combination of the above-described embodiments and modifications is also useful as an embodiment of the present invention. The new embodiment produced by the combination has the respective effects of the combined embodiment and modification. Further, it is also understood by those skilled in the art that the functions to be fulfilled by the constituent elements described in the claims are actualized by the individual constituent element exhibited in the embodiments and the modifications or actualized by the cooperation thereof. For example, the control unit described in the claims may be achieved by one of the image output unit 50 and the panel controller 42 described in the above-described embodiments or modifications, or by cooperation between the image output unit 50 and the panel controller 42.

REFERENCE SIGNS LIST

10 HMD
12 Panel
14 Lens
30 PC
32 Image generation unit
42 Panel controller
46 Start position storage unit
50 Image output unit
100 Entertainment system

INDUSTRIAL APPLICABILITY

The technology described in the present disclosure can be used for head mounted displays.

The invention claimed is:
1. A head mounted display comprising:
a left screen that displays an image for a left-eye;
a right screen that displays an image for a right-eye;
a left lens that magnifies the image for the left-eye displayed on the left screen and presents the magnified left-eye image to a user;
a right lens that magnifies the image for the right-eye displayed on the right screen and presents the magnified right-eye image to the user;
a storage unit;
an acquisition unit; and
a control unit, wherein
the left screen has a region exceeding an area of the left screen capturable by the left lens, and the left-eye image displayed in the region is not visually recognized by the user,
the right screen has a region exceeding an area of the right screen capturable by the right lens, and the right-eye image displayed in the region is not visually recognized by the user,
the storage unit stores a display start position of the left-eye image on the left screen and a display start position of the right-eye image on the right screen,
the display start position of the left-eye image and the display start position of the right-eye image are set to different values depending on a misalignment between the left lens and the right lens,
the acquisition unit acquires the left-eye image having a size corresponding to the size of the left lens and the right-eye image having a size corresponding to the size of the right lens, which are images generated by an external apparatus, and the control unit causes the left-eye image acquired by the acquisition unit to be displayed from the display start position of the left-eye image on the left screen stored in the storage unit and causes the right-eye image acquired by the acquisition unit to be displayed from the display start position of the right-eye image on the right screen stored in the storage unit.

2. The head mounted display according to claim 1, wherein the control unit causes a predetermined image that is independent of the left-eye image to be displayed on an area of the left screen where the left-eye image is not displayed and causes a predetermined image that is independent of the right-eye image to be displayed on an area of the right screen where the right-eye image is not displayed.

3. The head mounted display according to claim 1, wherein the control unit suppresses driving of a display element outside an area for displaying the left-eye image on the left screen while causing the left-eye image to be displayed by driving a display element in the area for displaying the left-eye image on the left screen, and suppresses driving of a display element outside an area for displaying the right-eye image on the right screen while causing the right-eye image to be displayed by driving a display element in the area for displaying the right-eye image on the right screen.

4. The head mounted display according to claim 1, wherein the misalignment is a vertical misalignment.

5. The head mounted display according to claim 4, wherein the misalignment is caused by an assembly error in the manufacturing process.

6. The head mounted display according to claim 5, wherein the display start position of the image for the left-eye and the display start position of the image for the right-eye have values that reflect the assembly error.

7. A head mounted display comprising:
a left screen that displays an image for a left-eye;
a right screen that displays an image for a right-eye;
a left lens that magnifies the image for the left-eye displayed on the left screen and presents the magnified left-eye image to a user;
a right lens that magnifies the image for the right-eye displayed on the right screen and presents the magnified right-eye image to the user;
a storage unit;
a generation unit; and
a control unit, wherein
the left screen has a region exceeding an area of the left screen capturable by the left lens, and the left-eye image displayed in the region is not visually recognized by the user,
the right screen has a region exceeding an area of the right screen capturable by the right lens, and the right-eye image displayed in the region is not visually recognized by the user,
the storage unit stores a display start position of the left-eye image on the left screen and a display start position of the right-eye image on the right screen,
the display start position of the left-eye image and the display start position of the right-eye image are set to different values depending on a misalignment between the left lens and the right lens, the generation unit generates the left-eye image having a size corresponding to the size of the left lens and the right-eye image having a size corresponding to the size of the right lens, and the control unit causes the left-eye image generated by the generation unit to be displayed from the display start position of the left-eye image on the left screen stored in the storage unit and causes the right-eye image generated by the generation unit to be displayed from the display start position of the right-eye image on the right screen stored in the storage unit.

8. The head mounted display according to claim 7, wherein the control unit causes a predetermined image that is independent of the left-eye image to be displayed on an area of the left screen where the left-eye image is not displayed and causes a predetermined image that is independent of the right-eye image to be displayed on an area of the right screen where the right-eye image is not displayed.

9. The head mounted display according to claim 7, wherein the control unit suppresses driving of a display element outside an area for displaying the left-eye image on the left screen while causing the left-eye image to be displayed by driving a display element in the area for displaying the left-eye image on the left screen, and suppresses driving of a display element outside an area for displaying the right-eye image on the right screen while causing the right-eye image to be displayed by driving a display element in the area for displaying the right-eye image on the right screen.

10. A method for displaying an image, which is executed by a head mounted display including a left screen for displaying an image to a left-eye, a right screen for displaying an image to a right-eye, a left lens for magnifying the image for the left-eye displayed on the left screen and presenting the magnified left-eye image to a user, a right lens for magnifying the image for the right-eye displayed on the right screen and presenting the magnified right-eye image to the user, and a storage unit,
the left screen having a region exceeding an area of the left screen capturable by the left lens, and the left-eye image displayed in the region is not visually recognized by the user,
the right screen having a region exceeding an area of the right screen capturable by the right lens, and the right-eye image displayed in the region is not visually recognized by the user,
the storage unit storing a display start position of the left-eye image on the left screen and a display start position of the right-eye image on the right screen,
the display start position of the left-eye image and the display start position of the right-eye image being set to different values depending on a misalignment between the left lens and the right lens,
the method comprising:
acquiring the left-eye image having a size corresponding to the size of the left lens and the right-eye image having a size corresponding to the size of the right lens, which are images generated by an external apparatus; and
causing the left-eye image acquired in the acquiring to be displayed from the display start position of the left-eye image on the left screen stored in the storage unit and causing the right-eye image acquired in the acquiring to be displayed from the display start position of the right-eye image on the right screen stored in the storage unit.

* * * * *